L. J. WEINSTEIN.
PARALLELING DEVICE.
APPLICATION FILED JAN. 6, 1920.

1,345,815.

Patented July 6, 1920.
2 SHEETS—SHEET 1.

Inventor:
Louis J. Weinstein, by Wolfe & Moses

Att'ys.

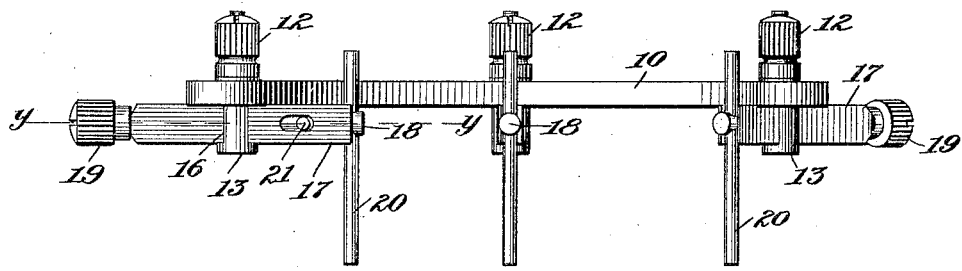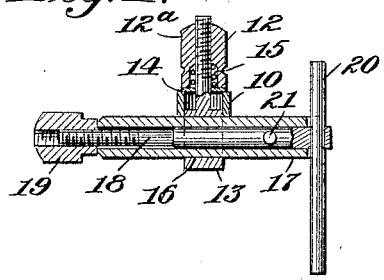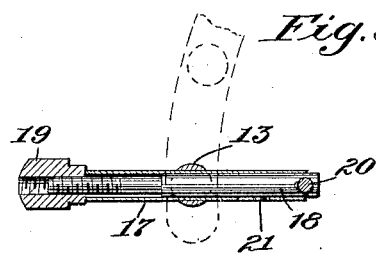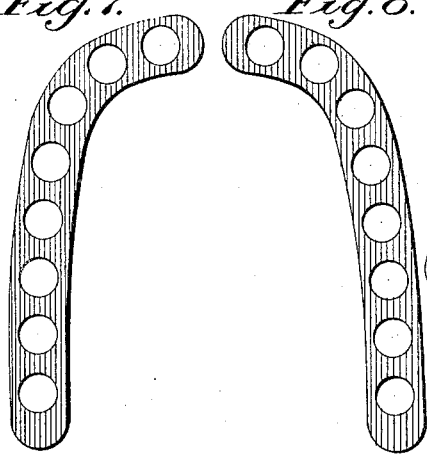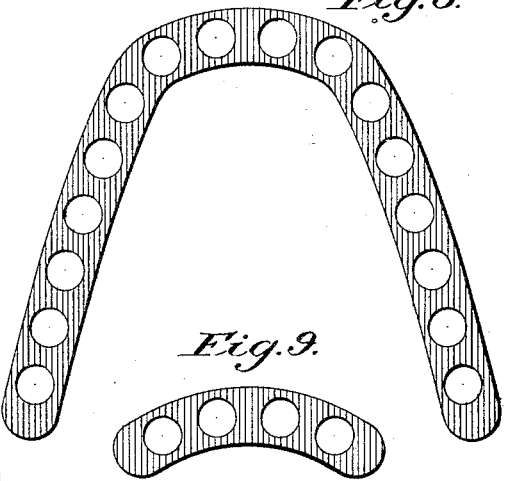

UNITED STATES PATENT OFFICE.

LOUIS J. WEINSTEIN, OF NEW YORK, N. Y.

PARALLELING DEVICE.

1,345,815.   Specification of Letters Patent.   Patented July 6, 1920.

Application filed January 6, 1920. Serial No. 349,683.

*To all whom it may concern:*

Be it known that I, LOUIS J. WEINSTEIN, a citizen of the United States, residing at New York, in the county of New York and State of New York, have invented certain new and useful Improvements in Paralleling Devices, of which the following is a specification.

The invention relates to devices applicable in the dental art for paralleling tooth surfaces, tooth cavities, root canals and particularly for paralleling abutments for bridges of either the removable or fixed type. Those skilled in the dental art will readily recognize the necessity for such a device in paralleling the abutments of dental bridges of the split pin and tube type, particularly when the natural teeth utilized for the abutments are relatively inclined to such degree as to prevent accurate positioning of the tube, for example, so that the "dummy" or removable portion of the bridge may be inserted and removed without difficulty.

An exemplary construction of the new appliance is shown on the drawing, in which—

Fig. 3 is an elevation of one form of the appliance, that of Fig. 9.

Fig. 4 is a vertical section through $x$—$x$ of Fig. 1.

Fig. 5 is a horizontal section on $y$—$y$ of Fig. 3.

Figs. 6, 7, 8 and 9 show various forms of the arcuate base plate.

Figure 1:
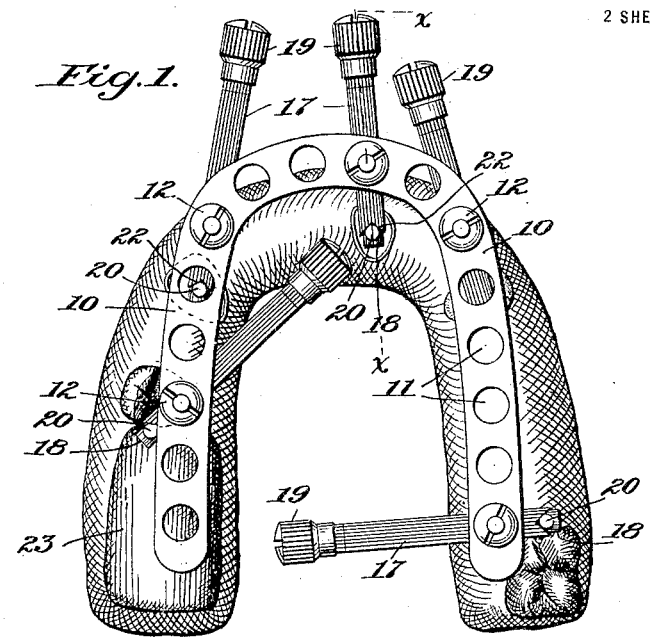
Figure 1 is a plan view showing an embodiment of the appliance as used in paralleling the abutments of a complete denture for the lower jaw, the natural teeth utilized as abutments being a central, cuspid and third molar on one side and a cuspid and second bicuspid on the other, a saddle being shown as attached to the latter abutment.

Referring to the figures, 10 is an arcuate supporting plate, the curvature of which may be any desired; for example, it may have the approximate form of the dental arch, as in Fig. 1, wherein the ends of the plate come rather within than over the dental arch, or it may conform more closely to the shape of the dental arch, as in Fig. 6; or it may have the form of only a part of the dental arch, as in Figs. 7, 8 and 9, in which the embodiment of Figs. 7 and 8 may be used for paralleling the abutments of a bridge located on one side only of the jaw; and that of Fig. 9 may serve for paralleling anterior teeth utilized as abutments.

Arcuate plate 10 is provided with a series of adjacent perforations or other equivalent arrangements 11 for the reception of screw clamps 12. A screw clamp 12 consists of a post 13 inserted in an opening 11, washer 14 and spiral spring 15 superposed respectively on post 13 above plate 10, and screw cap $12^a$ engaging the threaded upper end of post 13. The latter is provided at the lower end with a non-circular, for example rectangular, slot 16 for the reception of a bar 17 fitting slidably therein, adjustable longitudinally and retained in adjusted position by means of the screw cap $12^a$. Bar 17 is provided with a longitudinal bore for the reception of a pin 18, one end of which is threaded for the engagement of a screw cap 19, and having at the other end an opening for the reception of a paralleling pin 20, which is longitudinally adjustable therein and held in position by movement of screw cap 19. Screw caps $12^a$ and 19 are provided with slots for the reception of a key or the like, or are knurled to aid in manipulation. Bar 17 is perforated near the inner end with a longitudinal slot for the reception of a lug 21 provided on pin 18 and preventing rotary movement of the latter. A notch 22 is cut in the ends of bar 17 and aids in retention of paralleling pin 20.

With this appliance the operator may position the free ends of two, three or more paralleling pins 20 in as many abutments, for example, in root canals of teeth or in tubes and the like attached to crowns, inlays or similar attachments, so as to have all the pins and tubes parallel with respect to each other. Fig. 1 shows the appliance used for paralleling the attachments of five teeth utilized as abutments for a complete denture, a saddle 23 being shown by way of illustration as attached to bridge. In this figure arcuate plate 10 is given a hairpin curve, the ends lying rather inside than exactly over the dental arch; in this form the posterior abutments can be paralleled by manipulating bars 17, and therewith paralleling pins 20, from within the dental arch, which is of decided advantage when working in a small oral cavity.

The ends of paralleling pins 20 to be inserted in the abutment tube, cavity or the like may vary in size corresponding to that of the tube or drill used by the operator.

Figure 2:
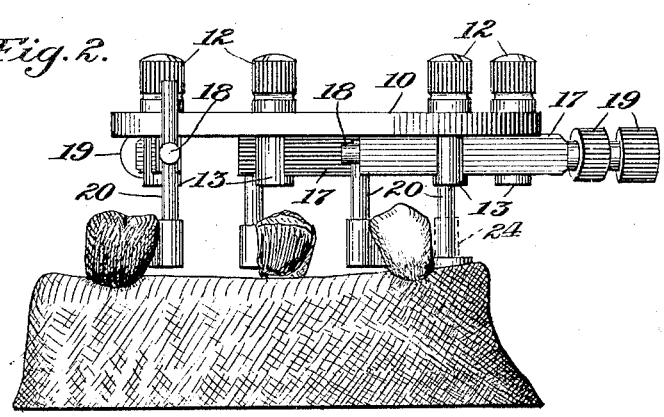
Fig. 2 is a lateral elevation of Fig. 1, seen from the right (one cuspid not shown).

The entire appliance may be placed in the oral cavity, the abutments adjusted therewith and the whole removed with the impression; or, pins 20 may be released from the remainder of the device, which latter is removed from the mouth leaving the pins in the abutments. The impression may then be taken with the pins in position, tubes 24 (Fig. 2 in dotted lines) having been placed previously over the pins if it is desired that these remain in the abutments; when the model is poured and the whole set up on the articular or other similar device, the pins and abutment tubes will appear in proper relative positions thereon.

The construction described herein and shown on the drawings is substantially that of my invention, but the latter is not limited thereto nor to the exact method of application disclosed. For example, pins 20 may be tubular and serve to parallel pins which are to be permanently positioned in abutment teeth. These paralleling pins or tubes, ordinarily of the same material as the remainder of the device, for example, steel, may be of material suitable for permanent attachment in the abutment, for example, gold, platinum, palladium, or alloys thereof, in which case they may be positioned in the abutment permanently, for example, cemented therein, after being paralleled and before removal from the remainder of the device.

Instead of adjacent perforations 11, arcuate plate 10 may be provided with successively positioned longitudinal slots, or with one longitudinal slot extending from one end to the other thereof, in which bars 17 may be adjusted.

As stated above, any number of abutments may be paralleled, the number thereof being limited only by the number of teeth retained and utilized as abutments for the artificial denture.

I claim:

1. In a dental paralleling device, an arcuate base plate, arms rotatably and slidably supported thereon and paralleling elements adjustable in said arms at an angle thereto.

2. In a dental paralleling device, a curved base plate a portion of which conforms to the shape of the anterior portion of the dental arch and the ends of which lie within the posterior portions of the dental arch, arms rotatably and slidably supported on said base plate and paralleling elements adjustable in said arms at an angle thereto.

3. In a dental paralleling device, a perforated base plate curved to conform to the dental arch, rotatable clamping elements mounted in the perforations of said curved plate, hollow bars longitudinally slidable and adjustable in said clamping elements, perforated pins slidably adjustable in said hollow bars and paralleling elements removably and adjustably attached in the perforations of said pins.

4. In a dental paralleling device, a perforated base plate curved to conform to a part of the dental arch, rotatable clamping elements mounted in the perforations of said curved plate, hollow bars longitudinally slidable and adjustable in said clamping elements, perforated pins slidably adjustable in said hollow bars and paralleling elements removably and adjustably attached in the perforations of said pins.

In testimony whereof I affix my signature.

LOUIS J. WEINSTEIN.